Patented Mar. 6, 1951

2,543,799

UNITED STATES PATENT OFFICE 2,543,799

ADHESIVE

Philip V. Palmquist, New Canada Township, Ramsey County, and Donald J. Douglas, Mendota Township, Dakota County, Minn., assignors to Minnesota Mining & Manufacturing Company, St. Paul, Minn., a corporation of Delaware No Drawing. Application May 22, 1947,
Serial No. 749,878

3 Claims. (Cl. 260—21)

This invention relates to adhesive compositions, and specifically to those adhesive compositions having the property of "slow grab," i. e. which require either prolonged contact at low pressure, or relatively high application pressure for shorter periods of contact, in order to develop adhesion to the surface to which they are to be adherently attached.

This application is a continuation-in-part of our application Serial No. 549,496, filed August 14, 1944, now abandoned.

While the compositions of the invention are of value in many different cementing and adhering operations, they are of particular utility in the cementing of coated reflex reflector sheet material, such as metal foil, coated paper, or resinous film having a layer of small glass spheres on one side thereof, to painted wood, metal, or like base surfaces for the preparation of highway markers, advertising signboards, and the like. The following description and discussion is therefore based on the particular combination of properties found to be of most value in the preparation of signs and markers employing reflex reflector sheet material adhesively mounted on a rigid base, as for example the reflex reflectors of U. S. Patent No. 2,354,049 issued to P. V. Palmquist. However, it will be understood that other variations may be more desirable for other applications, for example, when more limited areas of contact are under consideration, or where two rigid objects are to be cemented together, or in other situations which, however, depend in general on requirements of temporary "slow grab" and permanent adhesive bonding.

Advertising posters and similar sheet materials have customarily been cemented in place by means of solvent type cements which are sticky and smeary while wet but which dry out to a firm hard state by evaporation of solvent. For the ordinary paper poster as used on billboards, starch paste or the like is a satisfactory adhesive, since the application is temporary only. The billboard is first coated with the wet ahesive, and the paper poster is applied and slid into approximate positioning; evaporation of the water through the paper sheet then produces a rigid but low strength and non-weatherproof bond.

Where a more nearly permanent type of bond is required, water-insoluble cements have been used. These prior cements also are tacky and smeary while wet, becoming firm and hard on evaporation of solvent. While such a cement is still wet, a section of sheet material placed thereon will immediately adhere, and may then be moved or re-positioned only by pulling the sheet away (thus splitting the cement layer) and again putting the sheet down in a new location. The distribution of cement is thus altered, resulting in unevenness of coat and in some cases in faulty bonding. Since a considerable amount of solvent is retained by the cement, blistering and loosening of the sheet is frequently encountered on further drying, particularly in the application of non-porous sheets or films; or drying is retarded, and the cement remains soft and weak.

An object of this invention is therefore the provision of an adhesive cement composition which permits the removal and readjustment of contacting surfaces during positioning thereof while still providing permanent adhesive bonding after the contacting surfaces have been suitably placed together. Another object is the provision of an adhesive composition having the property of "slow grab." Another object is the provision of an adhesive composition which retains the property of "slow grab" for a desirably long time interval. An additional object is to provide a means of permanently and adhesively cementing surfaces together in predetermined interrelationship. Other objects will become apparent as the description proceeds.

It has now been found that certain plasticized partially cured adhesive resin compositions coated from a volatile solvent on a surface and allowed to dry to an essentially tack-free stage, have for a desirably long time the property of "slow grab" as well as high permanent bonding properties. The coated surface may be tested by placing the fingertips thereon under moderate pressure for a period of two seconds, and then jerking them away; when proper drying has been achieved and the "slow grab" stage has been reached the coating will feel "tacky" but there will be no transfer of adhesibe to the fingers. At this point, while a small amount of solvent may still remain in the composition, it is insufficient to cause blistering or softening after application of even completely impervious sheet material to the adhesive surface. Sheet material such as themoplastic film, treated paper, or the like, may then be laid on the adhesive surface and slid about thereon without becoming adhesively bonded. This condition may be maintained as long as the sheet material is kept in substantially continual sliding motion; or even if temporarily allowed to come to rest to the extent of obtaining a slight degree of bonding, the sheet may again be loosened by a light jerky pull away from the cemented surface. When the sheet has been slid or manipulated into any desired position on the cemented surface, for example with reference to a previously applied sheet or border or to any underlying printing or the like, and within a reasonable length of time, it may be readily and permanently bonded to the adhesive surface by simple pressure. For best results, pressure applied outwardly along with the surface of the sheet with the fingers or with a soft rubber roller is desirable in order to remove any entrapped air; but in the case of a sufficiently flexible sheet material, the weight of the sheet itself is frequently sufficient to cause effective bonding over a sufficient interval of time.

In the following examples, in which all parts are by weight, are described certain specific combinations of soluble partially cured resins, plasticizers, solvents, and catalysts (or curing agents) which have been found to possess desirable properties of permanent bonding to a variety of surfaces, together with the property of "slow grab" as above described. In addition, these specific solutions in general possess good aging life; i. e. they do not thicken or "gel," nor do they thin out or lose their high bonding power, on prolonged storage.

Example 1

| | |
|---|---:|
| Urea-formaldehyde-butanol resin solution | 100 |
| Heavy blown castor oil (such as Baker Castor Oil Co. No. 15 heavy blown castor oil) | 36 |
| Isopropyl alcohol | 48 |
| Catalyst | 1.5 |

The urea-formaldehyde-butanol resin solution is made as follows: to 1000 parts of 37% formaldehyde solution, add ammonium hydroxide (28% solution) until the pH is between 7 and 8; this requires approximately 20 parts of ammonia. Add 240 parts of urea, and heat the mixture in a suitable kettle at 85° C. for 50–55 minutes or until the urea is all dissolved. Apply a vacuum and drop the temperature to 55–60° C., and then add 592 parts of n-butyl alcohol, 60 parts petroleum xylol and 6 parts of orthophosphoric acid (90%) and continue heating and distilling under vacuum, removing the water but returning the organic solvent to the still. When no more water comes over, cautiously distill out a portion of the solvent, to produce a viscous, clear solution containing 58% by weight of residual solids. This solution is diluted with n-butyl alcohol to 50% solids content for use.

Other proportions and other ingredients may be employed in making equivalent amino-aldehyde resins. For example: the ratio of formaldehyde to urea may be reduced to 2.5–1; paraformaldehyde, or thiourea or melamine, may replace part or all of the aldehyde and amine respectively; and other variations known to those skilled in the art may be made, provided the products come within the proper range of analytical values as hereinbelow set forth.

The residual solids content, i. e. the resin content, of the resin solution is determined by weighing a 2–3 gram sample into an open dish, holding in an oven heated at 105° C. for two hours, and determining the remaining weight percentage.

The final distillation and removal of solvent in the above preparation of amino-aldehyde resin is preferably carried out at a temperature corresponding to atmospheric pressure. When a reduced pressure and temperature are used, the product is frequently found to be insufficiently polymerized, and a further heating period is then required.

The extent of polymerization of the amino-aldehyde-alcohol resin is conveniently estimated by means of a xylol turbidity test, which may be carried out in the following manner:

Add 75 ml. of xylene to 10 grams of resin solution containing 50% residual solids and at least one-half that percentage of butanol. Titrate the resulting dilute solution at 25° C. with xylene, cautiously and with continuous mechanical stirring, to the point at which turbidity of the solution appears. Calculate the percentage of xylene in the final solution. This percentage is the "turbidity number."

A resin which shows turbidity at about 98% xylene, i. e. a turbidity number of about 98, is sufficiently polymerized to produce a "slow-grab" adhesive which will harden satisfactorily in use, whereas resins which do not show turbidity at this percentage of xylene form adhesives which remain soft and weak after application even on long aging. Conversely, resins which produce turbidity at less than about 93% xylene are found to be too highly reacted, since adhesives compounded from such resins form "shockable" or brittle bonds between adherently attached surfaces.

A small amount of petroleum xylol, xylene, or other equivalent organic liquid, is added to the resin solution during the reaction with the n-butyl alcohol, as indicated in the example, in order to promote the separation of water and alcohol in the condensate. This material may be substantially completely removed during the final distillation and removal of solvent, or it may allowed to remain in the solution. The concentrated resin solution may be made up to the desired 50% concentration with butyl alcohol as shown, or may preferably be diluted with a mixture of solvents, e. g. such that the final formula is 50% resin, 30% butyl alcohol, 20% xylene.

The heavy blown castor oil plasticizer of Example 1 is compatible with the urea-formaldehyde-butanol resin, producing a homogeneous liquid composition and a smooth coated adhesive cement film. It imparts to the adhesive composition the ability to adhere firmly to various difficulty bonded surfaces. This latter property is believed to be primarily a function of the number of free hydroxyl groups present in the plasticizer molecule, as measured by the acetyl value.

For any given acetyl value, the viscosity of the plasticizer is also important in determining the effectiveness of the resulting adhesive composition. For example, an adhesive comprising a compatible plasticizer having too low a viscosity is found to form a weak and brittle or shockable bond; that is, the adhered surfaces may be easily broken apart. On the other hand, materials having extremely high viscosities are frequently found to be incompatible with the amino-aldehyde-alcohol resin.

It is found that non-volatile compatible hydroxylated plasticizers having an acetyl value of at least about 30, and preferably at least 70, and a viscosity such that the product of the acetyl value and the viscosity is not less than about 500, are suitable for the applications herein contemplated.

Acetyl value is expressed as the number of milligrams of KOH equivalent to the amount of acetic acid required for acetylation of one gram of the original material.

The viscosity is conveniently determined by means of a MacMichael viscosimeter, and is given in poise at 45° C. For some plasticizers the viscosity must be measured in terms of a more or less concentrated solution, since the undiluted plasticizer is too viscous for measurement with the MacMichael or similar type of instrument. The viscosity of the plasticizer alone will obviously be greater than the viscosity of such solutions.

Samples of heavy blown castor oil having acetyl values of 120-130 and viscosities of 30-50 poise at 45° C. have been used with urea-formaldehyde-butanol resins having a turbidity number of 93-98, and preferably in the more limited turbidity number range of 95-97, in the preparation of the novel slow-grab adhesive compositions of the present invention. The product of acetyl value and viscosity in this case is seen to be at least about 3600, and represents a preferred type of plasticizer. Other specific examples of useful compatible plasticizers will appear hereinafter.

The catalyst used in Example 1 is an acid alkyl ester of phosphoric acid made by heating three mols of methyl alcohol with one mol of phosphorous pentoxide in the presence of ethyl ether as a heat exchange medium; heating is continued until a clear liquid is obtained, whereupon n-butyl alcohol is added in sufficient amount, and the ether removed by fractionation, to produce a catalyst containing 50% volatiles.

In a preferred method of compounding the cement composition of this example, the resin solution, plasticizer, and catalyst are added in that order to the solvent in a paddle-type mixer and the mass is stirred until homogeneous. As thus prepared, the solution may be stored in closed containers at ordinary room temperature for long periods of time without deterioration. The solution may be applied by brushing or spraying. It may, for example, be applied in a uniform layer of about 6 grams per square foot to panels such as painted wood, aluminum, steel, or glass, and then allowed to dry for approximately 30 minutes at room temperature, to the non-smearing, "slow-grab" state. A printed, decorative or other desired type of surface covering sheet material, may then be placed in contact with the dried cement film and slid or moved around thereon until brought into proper position. When such position is reached, continued contact of the sheet with the cement film, either under its own weight or more rapidly and hence desirably under additional pressure as by means of a weighted soft rubber roller, produces a firm bonding action between the cement and the sheet material; the latter cannot be further moved on the surface, and cannot be stripped therefrom without danger of tearing or otherwise vecoming unfit for use. The "slow grab" condition persists under normal room conditions for from 30 minutes to as long as several hours, during which time the surface covering material may at any time be applied with usefully adequate bonding. Thereafter, the cement coating will have become cured beyond the "slow grab" stage and will not produce an effective bond on simple pressure application at normal room temperature.

*Example 2*

Melamine-formaldehyde butanol resin solution _____ 100
  (Titration value 93-98; 60% solution in equal weights of butanol and xylene.)
Heavy blown castor oil _____ 30
Isopropyl alcohol _____ 48
Catalyst _____ 1.5
  (Organic acid phosphate dissolved in alcohol)

The ingredients are blended together as described under Example 1 to produce a useful "slow grab" adhesive cement composition.

The cement dried down in thin films to produce a nonsmearing surface having good "slow grab" as well as good permanent adhesion, and is somewhat harder in final cured form than the cement of Example 1. The solution has a tendency to thicken on standing in closed containers at slightly elevated temperatures, for example at 100-150° F., but has a reasonably prolonged aging life at normal room temperatures.

While it is ordinarily more desirable, in cementing flexible sheets to rigid surfaces, to apply the cement compositions of this invention to the rigid or underlying surface and later to adhere the flexible sheet material thereto, it is also possible to coat the cement on the flexible sheet, as by spray gun, brush, or even by roll coating or the like, and to then allow the coated sheet to remain uncovered and open to the air until the "slow grab" stage has been reached, and subsequently to position the coated sheet on the rigid base.

Application by means of hand brushing to relatively large areas results in uneven thicknesses of the cement film, and accordingly in uneven drying. Use of a number of small sections of flexible sheet material, or of intricately patterned sheets which require careful matching, results in slow application of the sheets to the cemented base. It is therefore essential that the "slow grab" property persists for a considerable time, which should be at least one-half hour and which may in some cases be as high as several hours, in order to be certain of adequate bonding to all sections of the surfacing sheet.

For best results, the cement should dry to the "slow grab" state as rapidly as possible while still having time to flow or level out and thereby minimize brush-marks or other local irregularities.

Isopropyl alcohol, specified in the examples, has desirable solvent power and rate of evaporation for use in these compositions where they are intended for the application of reflex reflector sheets in the manner indicated. This solvent also appears to inhibit the action of the organic acid phosphate catalyst, so that the resinous constituents do not further react and thereby cause thickening or gelling while in storage in solution form. Certain other solvents, in some cases in combination with cheap or otherwise desirable diluents, may also be employed. Thus normal propyl alcohol, or the butyl alcohols, are good solvents and are nearly equivalent to isopropyl alcohol in evaporative rate; they do not cause gelation even on long aging; but they sometimes result in slight reduction in final bonding value of the cement, particularly when the solution has been stored for a long time at somewhat elevated temperatures. Ethylene glycol monoethyl ether is an excellent solvent, and may be used in conjunction with a relatively high percentage of an inert diluent such as heptane or other volatile hydrocarbon; the solvent is relatively slow drying, and shows a slight tendency toward gelation or thickening of the cement on long storage. Combinations of ethylene glycol monoethyl ether with butyl or propyl alcohols have been found to be of value.

Lower alcohols, for example ethyl alcohol, and more particularly the more volatile esters, ketones and the like such as ethyl acetate and acetone are somewhat less desirable as solvents for the cements. For the present known industrially important uses and applications of the cements of this invention it is generally desirable to utilize as solvents the less rapidly volatile alcohols such as isopropanol, tertiary butanol, and the like, although in some cases the more volatile solvents may be employed in whole or in part.

While the activity of the catalyst in the solution is ordinarily repressed to a large extent by the solvent, said catalyst may still exert some thickening effect on the cement during storage, particularly when present in increased amounts. On the other hand, increased catalyst provides a more rapid attainment of the final permanent bonding properties, which is a desirable condition when adhering reflex reflector or other sheet materials subject to undesired removal through vandalism, or for high-speed production of coated signs and the like. The proportion of catalyst must therefore be regulated with these conflicting requirements in mind. In the foregoing examples, the amount of catalyst is such as to give a normal shelf life of at least about one year, and curing to a vandal-proof stage on a reflex reflector sheet material in not more than about 48 hours.

The use of catalysts for the final hardening of the partially cured amino-aldehyde resins in the above formulas has many advantages, but is not an essential part of this invention, since final hardening of these resinous cements may also be accomplished by other agencies such as heat or actinic light. Where catalysts are employed, such for example as the acid phosphate catalyst of Example 1, it is found desirable to mix the thermo-setting resin, and usually the plasticizer, into the alcohol solvent before adding the catalyst, in order that the setting of the resin be properly inhibited.

The ratio of amino-aldehyde resin to plasticizer may vary somewhat, as indicated by the preceding examples, but will in general be found to be within the approximate range of 25 to 45 parts of plasticizer for 50 parts of resin, except that plasticizers of very high acetyl value appear to be effective at somewhat lower concentrations. Preferably, and particularly for compositions designed to bond flexible reflex-reflector sheet material to painted wood or the like, this ratio is within the more limited range of 30 to 36 parts of plasticizer to 50 parts of resin. Example 1 provides an illustration of such a composition.

The particular ratio between plasticizer and resin to be employed in any specific combination will of course be dependent on the specific components used. In general, when within the approximate limits herein given, the compositions of this invention provide the desired "slow grab," as well as adequate bonding power and toughness. Too great a proportion of plasticizer produces a permanently soft, sticky or smeary adhesive, while an excessive proportion of amino-aldehyde-alcohol resin results in a hard, non-tacky, and brittle product. In cases where the sheet material may be applied to the cemented surface at somewhat above room temperature and/or somewhat above normal finger-tip or hand-roller pressure, it may be desirable to reduce the amount of plasticizer to a minimum so as to obtain the advantages of more rapid set to the vandal-proof condition. This may be particularly true of high speed accurately controlled machine application as distinguished from the less carefully controlled hand methods of application.

Among the plasticizers which are found to be compatible with amino-aldehyde-alcohol resins as here specified, high in hydroxyl content and in adhesion-imparting properties, and of sufficiently high viscosity, and which are therefore to be considered equivalent to the heavy bodied castor oil specified in the illustrative examples (and including here for comparison) may be listed the following materials:

| Plasticizer | Acetyl No. | Viscosity |
| --- | --- | --- |
| Heavy bodied castor oil | 126 | 33. |
| Glycerine (anhydrous) | 1,800 | 1.9. |
| Alkyd resin | 150 | 16 (90% Sol'n.). |
| Phenol-modified alkyd resin | 27 | 370 (80% Sol'n.). |
| Bodied hydroxylated linseed oil | 98 | 11.4. |

Substantially anhydrous glycerine provides a long-aging adhesive solution and an excellent adhesive film, equal to or somewhat better than that of Example 1.

The alkyd resin was prepared from sebacic acid, ethylene glycol, and glycerol. It was diluted to 90% solids with xylol for measurement of viscosity, since the undiluted material was a soft plastic resinous mass. This resin imparted required properties to the adhesive film when present in the proportions of 27, 36, and 42 parts to 50 parts of an aminoaldehyde resin as used in Example 1.

The phenol-modified alkyd resin was a commercially available material described as consisting of 25 parts of a polyhydric alcohol, polybasic acid alkyd modified with 50 parts of an unsaturated fatty acid and with 25 parts of a phenolic resin. Phthalic anhydride was used as the polybasic acid, and tung oil free fatty acids as the unsaturated fatty acid. The resin was available, at the time of this application, as a 50% solution in mineral spirits. The resin was listed as having the following properties: acid number, 17–24; refractive index, 1.535; specific gravity, 1.06. While not contributing to the acetyl value as determined by analysis, the phenolic modifier is believed to have had a considerable influence toward increasing the adhesion of the resulting adhesive composition.

Bodied hydroxylated oils, such as linseed or soy bean oils, may be prepared either by blowing the oils at an elevated temperature with the addition of a small amount of ethylene glycol as a catalyst, or by any other suitable procedure. Useful "slow grab" adhesive compositions are obtained by using such hydroxylated oils, having acetyl and viscosity values within the required range, as plasticizers for amino-aldehyde-alcohol resins, in accordance with our invention. The particular hydroxylated oil here used had the following additional properties: iodine value, 100; saponification value, 216; acid value, 8; specific gravity, 1.033.

The plasticizers hereinabove tabulated were found to produce useful "slow grab" and adhesion properties when used in the proportion of 25–45 parts of plasticizer to 50 parts of amino-aldehyde-alcohol resin having a titration value of 93–98, as illustrated by the resins of the specific examples. Other materials ordinarily considered as equivalent plasticizers but with either a low viscosity, or a low acetyl value, or both, were similarly tested, but the resulting compositions could not be successfully employed as "slow grab" permanently bonding adhesive cements.

The addition of various modifying agents to the novel "slow grab" cement compositions of this invention, as long as such additions do not seriously adversely effect the "slow grab" property, is to be included in the scope of the invention. Inert pigments or dyes, for example, may be added in relatively small percentages for the preparation of colored cements, particularly for use in cementing transparent films and the like.

Coating of these fairly fluid cement compositions on porous surfaces such as untreated or unpainted wood frequently results in a "starved" coat and a lowering of the expected degree of adhesion. Additional coats of the cement must then be applied in order to obtain the desired bond. In general, sufficient cement should be used so that the dried surface during the period of "slow grab" should be continuous and glossy.

Various combinations of amino-aldehyde resins with oils, alkyd resins, and other similar materials have long been known in which the amino-aldehyde resin was plasticized, toughened or otherwise modified by the added ingredients. However, we are not aware of any prior art compositions of these or other ingredients which have been so proportioned as to produce in thin films thereof the property of "slow grab" as herein defined, and which includes the preservation of that property for a sufficiently long time, of the order of thirty minutes or more under the conditions herein described, so as to make economically and commercially possible the full utilization of this valuable property.

Having described various embodiments of our invention, for purposes of illustration rather than limitation, what we claim is as follows:

1. A long-aging liquid adhesive composition suitable for permanently and smoothly bonding sheet material to solid surfaces in accurately positioned relationship thereto, comprising a blend of (1), 50 parts by weight of a partially cured amino-aldehyde-alcohol resin having a xylol turbidity number of 93–98, (2) from 25 to 45 parts by weight of a compatible hydroxylated plasticizer having an acetyl value of at least 30 and a viscosity such that the product of the acetyl value times the viscosity is at least 500, (3), an acidic curing agent, and (4), a volatile solvent.

2. An adhesive composition according to claim 1 wherein the hydroxylated plasticizer is heavy-bodied castor oil.

3. An adhesive composition according to claim 1 wherein the hydroxylated plasticizer is substantially anhydrous glycerine.

PHILIP V. PALMQUIST.
DONALD J. DOUGLAS.

REFERENCES CITED

The following references are of record in the file of this patent:

UNITED STATES PATENTS

| Number | Name | Date |
| --- | --- | --- |
| 2,201,891 | Edgar et al. | May 21, 1940 |
| 2,201,914 | Oeffinger et al. | May 21, 1940 |
| 2,292,468 | Oeffinger et al. | Aug. 11, 1942 |